Oct. 15, 1940.  J. L. HIPPLE  2,217,866
PLANTER ATTACHMENT FOR TRACTORS
Filed April 26, 1937  2 Sheets-Sheet 2
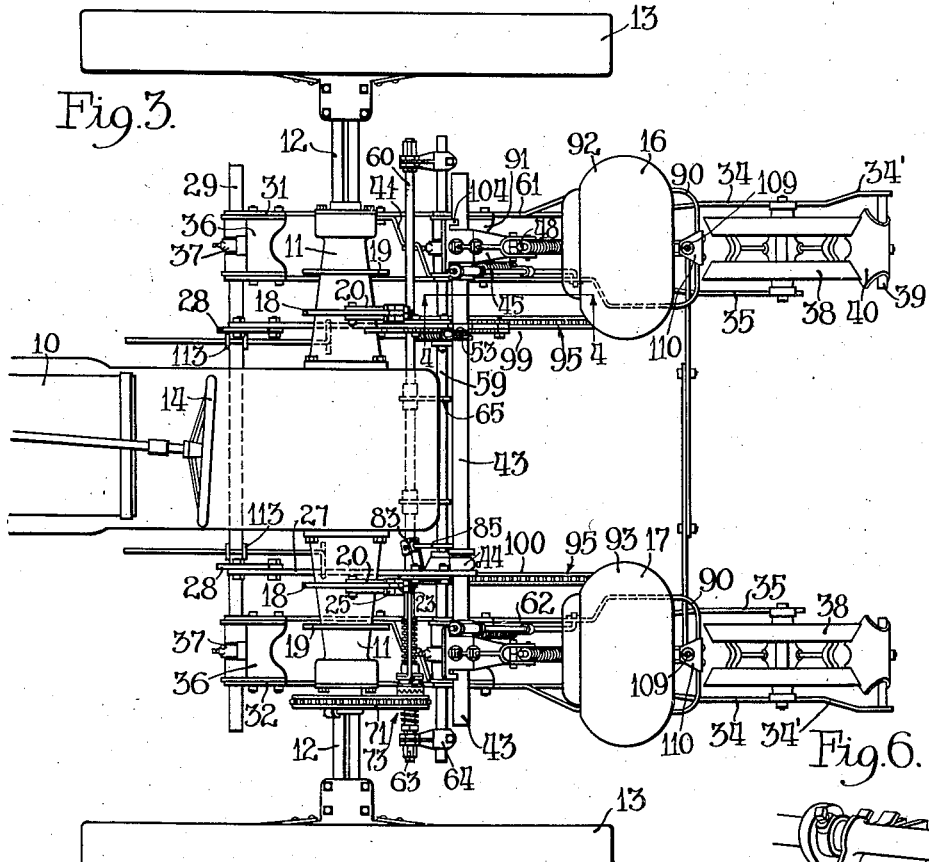
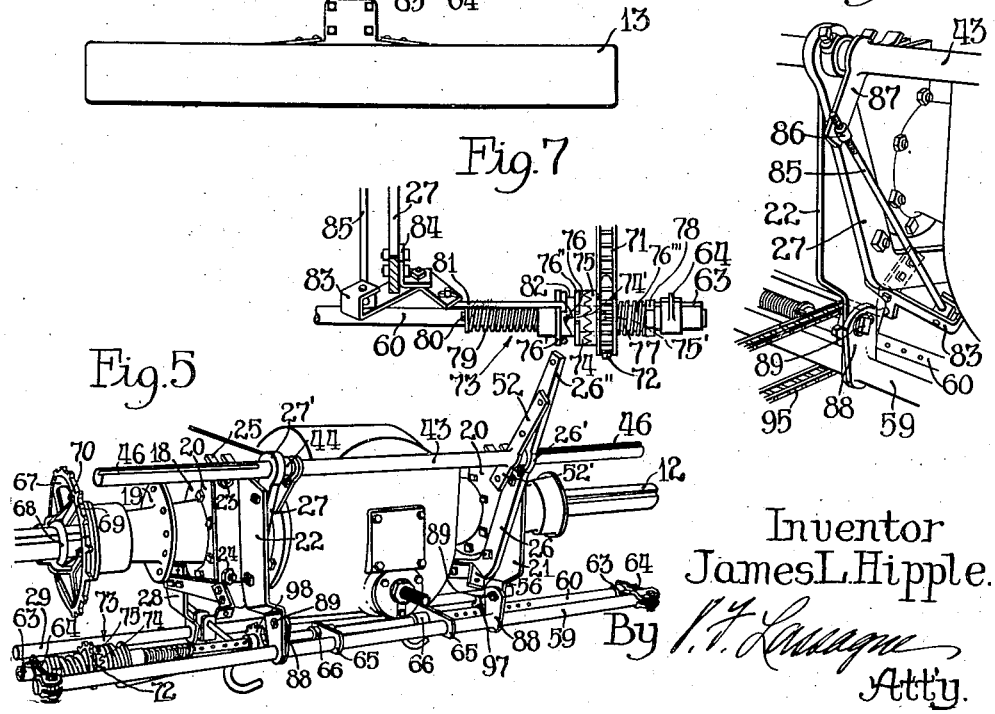
Inventor
James L. Hipple.
By *[signature]*
Att'y.

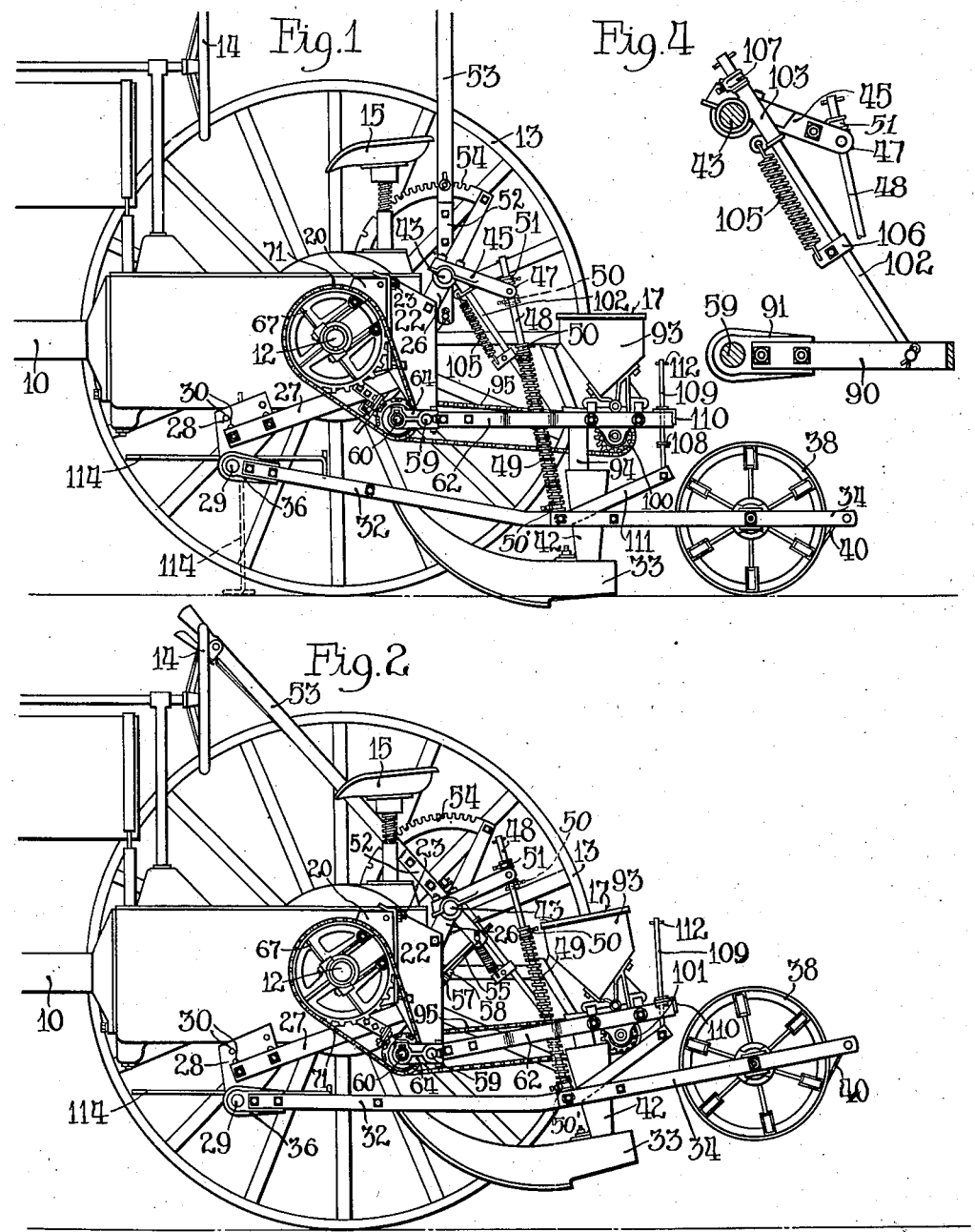

Patented Oct. 15, 1940

2,217,866

UNITED STATES PATENT OFFICE 2,217,866

PLANTER ATTACHMENT FOR TRACTORS

James L. Hipple, Canton, Ill., assignor to International Harvester Company, a corporation of New Jersey Application April 26, 1937, Serial No. 138,972

19 Claims. (Cl. 111—60)

This invention relates to farm implements and particularly to seed planter implements of the type that is adapted to be directly connected to farm tractors.

In directly connected tractor planters, heretofore, the hopper structure and furrow opener structure have been separately attached to the tractor, and, upon detaching the parts from the tractor, it has necessitated the separate removal of separate structures and the seed planter has not been left intact and ready for quick attachment to the tractor by simple minimum adjustments. Further, in order to allow for raising movement of the furrow opener frame during operation and to adjust the same to its transport position, the hopper structure has had to be somewhat removed in height from the furrow opener and seed boot devices, causing the seed to have to drop a considerable distance, so that proper timing of the seed was not readily attained, such as with the ordinary trailing low hopper drawn type of planters where the hopper is near to the ground.

It is, therefore, the principal object of this invention to provide a low hopper type of planter adapted for direct connection with the tractor, that is intact and may be quickly attached to or detached from the tractor, wherein the weight of seeds and hopper is carried independently of the furrow opener, thereby allowing for independent raising movement of the furrow opener during planting operation, and at the same time permitting the hoppers to be mounted nearer to the ground.

In general, the invention comprises a thrust and support structure which is readily attachable to and rigidly carried by the tractor, and to which the hopper structure and furrow opener frame are independently pivoted, one above the other, permitting independent movement of the furrow opener during the normal planting operation; also, various drive connections with the tractor to drive the seed hoppers, and means for simultaneously lifting the hopper structure and furrow opener about their pivots and to hold the same carried by the tractor in a transport position being provided.

Other objects and a clearer understanding of the invention will be had from the following detailed description taken with the accompanying drawings, in which:

Figure 1 is a side elevational view in ground engaging position of the planter applied to the rear end of a general purpose type of tractor of the tricycle type having its left rear wheel removed to show the planter drive mechanism;

Figure 2 is a side elevational view of the planter attachment, as shown in Figure 1, with the planter units in their transport position;

Figure 3 is a plan view of the planter attachment;

Figure 4 is an enlarged view of the counterbalancing mechanism for the hopper construction taken along line 4—4 of Figure 3, looking in the direction of the arrows;

Figure 5 is a perspective view showing the planter drive mechanism and lifting rockshaft mounted on the rear of the tractor;

Figure 6 is a perspective view showing the clutch throw-out mechanism for the drive shaft and its relationship to the lifting rock-shaft; and, Figure 7 is an enlarged detail view of the clutch and its throw-out operating mechanism.

In the present instance, the invention is illustrated as including a motor propelled wheel supported frame or tractor of the general purpose type, having a comparatively narrow longitudinal body frame 10 supported on a rear axle structure 11 in which are journaled axles 12 to which are adjustably secured wheels 13. The wheels are so positioned as to span two plant rows and are adjusted to ride in the furrows between the rows. The forward end of the tractor body 10 is supported on a single centrally positioned steering truck, not shown, which is steered in the usual manner by a steering wheel 14 adjacent an operator's station 15.

The structure of the planting attachment comprises a plurality of planting units or seed depositing mechanisms 16 and 17 positioned to the rear of the tractor, and having their draft connections extended forwardly underneath the tractor to a point intermediate the front and rear ends of the tractor. As the planting units 16 and 17 are similar in construction, only one will be described, and like reference characters will denote similar parts.

As best shown in Figures 1, 3 and 5, the tractor has positioned on the rear axle housings 11 a plurality of integral flanges 18 and 19. Mounted on the innermost flanges 18 are coupling members 20 to which complementary supporting members 21 and 22 are adapted to be quickly attached or detached by means of swinging bolts 23 and 24. The swinging bolts 23 and 24 are adapted to be swung through slots in the members 21 and 22. The bolts 23 are adapted to swing through a slotted supporting portion 25 on the upper ends of the supporting members 21 and 22, and the supporting portion 25 is adapted to support the planter attachment on the supporting members 21 and 22 while the planter is being attached in place. The structure described and its associated members form a transverse supporting structure mounted on the wheel supported frame or tractor.

As best shown in Figures 1, 2, 5 and 6, downwardly and forwardly inclined thrust members 26 and 27, which are secured to the supporting members 21 and 22, extend forwardly underneath the rear axle housings 11 to thereby provide for a close connection of the planter structure with the tractor to make a substantially unitary planter tractor structure. These inclined members 26 and 27, taken with supporting members 21 and 22, form the supporting structure for the parts of the planter structure. Mounted for adjustment on the forward ends of the thrust members 26 and 27 are adjustable supporting brackets 28. Secured to the brackets 28 is a transverse draft member 29, which extends underneath the body portion of the tractor and laterally from each side of the center line of the tractor. Adjusting holes 30 are provided on each of the brackets 28 to regulate the height of the planter furrow opener above the ground, to thereby permit planting in furrows, on beds, or on level ground. The upper set of holes is provided for planting in furrows. The middle set of holes is provided for planting on level ground, while the other set of holes is for planting on beds.

Pivotally mounted on the transverse draft member 29 and extending rearwardly therefrom are draft or implement frames 31 and 32 for furrow opener units or ground engaging tools 33. Each of the draft frames 31 and 32 includes pivotally mounted rearwardly extending covering wheel frame members 34 and 35. The furrow opener draft frames 31 and 32 are pivotally mounted at their forward end to the transverse draft member 29 by a draft connection bracket 36, and are secured in their adjusted position by adjusting collars 37. The draft frames 31 and 32 may be adjusted for row spacings from 30 to 48 inches by loosening the adjusting collars 37 and moving the draft connecting brackets 36 in or out, as desired. The covering wheel frame members 34 and 35 are bowed outwardly at their rear ends wherein is positioned, respectively, a covering or gauge wheel 38. The covering wheel frame member 34 extends rearwardly, as at 34', for mounting a support 39 on which is adjustably mounted a scraper 40. Intermediate the length of the draft frames 31 and 32 is securely mounted a stiffening bracket 41. The forward end of the furrow opener shoe 33 is secured to the mid-portion of the stiffening bracket 41 and is secured at its rear end to the draft frames 31 and 32 in the usual manner. A seed boot 42 is supported on the draft frame members 31 and 32 and attached to the furrow opener shoe 33. As best shown in Figures 1, 5 and 6, a transverse rock-shaft 43 is journaled in the upper ends 26' and 27', respectively, of the thrust members 26 and 27. Collars 44, mounted on the rock-shaft 43, and abutting the inner sides of the upper portions 26' and 27', prevent the lateral displacement of the rock-shaft. Clamped securely and adjustably mounted on the outer ends of the rock-shaft 43 are lifting arms 45 providing lifting means. The lifting arms 45 are adjustably mounted on the rock-shaft 43 by means of grooves 46 (Figure 5), which are engaged by a keyed portion of the lifting arms. A lost motion connection 47 is pivotally mounted on the lifting arm 45. Slidably mounted in the lost motion connection 47 is a pressure rod 48. The pressure rod 48 is pivotally connected at its lower portion to a support mounted on the draft frame for the furrow opener unit. A pressure spring 49 is mounted on the pressure rod 48 in the usual manner, and it is engaged by an adjusting collar 50 at its upper end in order to adjust the pressure of the spring. When it is desired to make use of the spring for supplying additional pressure of weight to the furrow opener, as in hard soil, the collar 50 is loosened and allowed to engage lost motion connection 47 and arm 45, and, to give greater pressure, a collar 50' is raised and fixed at a point on rod 48 removed from the furrow opener frame. An adjusting collar 51 is mounted at the upper end of the pressure rod and is engaged by the lost motion connection means 47 when the planter units are raised and lowered. The adjusting collar 51 is also used to regulate the maximum depth of the furrow opener units. The aforesaid structure with other details to be described later provides lifting means connected to said implement frame for adjusting said implement frame vertically whereby said implement frame and an upper frame structure to be described later are adjusted vertically at the same time.

A lever bracket 52 is welded or otherwise secured to the rock-shaft 43 and has secured thereto an adjusting lever 53, which extends to within reach of the operator's station 15. The adjusting lever 53 is adjusted in the usual manner by a thumb latch and detent about an adjusting quadrant 54, which is secured at its upper rear end to an extension 26'' of the thrust member 26, and at its lower front end, to the supporting member 21. The lever bracket 52, as best shown in Figures 1 and 5, extends forwardly on the opposite side of the rock-shaft 43, forming a connection 52' in which is pivotally mounted a counterbalancing spring rod 55. The spring rod 55 is slidably mounted in a bracket 56 (Figure 5) secured to the thrust member 20. A compression spring 57 is mounted on the rod 55, and the compression spring is adjusted by a nut 58. It is, therefore, evident that, as the lever 53 is operated, the spring 57 counterbalances the weight of the draft frames 31 and 32 for the furrow opener units.

Journaled in the lower ends of the supporting members 21 and 22 is a transverse supporting bar or transverse support 59, as best shown in Figures 3 and 5. The transverse supporting bar 59 is a support for a main planter drive shaft, or jack shaft, 60 and also a front support for planter hopper unit frames, or upper frame structures, 61 and 62. The planter drive shaft 60 is journaled in bearings 63 mounted in brackets 64, which are clamped to the ends of the supporting bar 59. The drive shaft 60 is supported intermediate its ends by supporting members 65 carrying bearings 66 in which the shaft is journaled.

The main drive shaft 60 is driven from the axle 12 of the tractor, as best shown in Figures 1, 3 and 5, by means of a sprocket 67 detachably mounted on the axle 12 by a slotted spider construction. The sprocket 67 is clamped on the axle by means of a U-shaped clamp bolt or clamp means 68. After the sprocket has been slid over the shaft by removing a portion of the teeth, as at 69, the section of teeth 69 is then secured in place by bolts 70. With this type of sprocket, it is obvious that the sprocket may be removed from the axle by simply removing the section 69 and disconnecting the clamp bolt 68. It is obvious that the parts are secured to the axle in the reverse order.

The shaft 60 is driven from the sprocket 67 by means of a chain, or flexible driving means, 71 driving a sprocket 72 of a clutch mechanism 73. The clutch mechanism 73, as best shown in Figures 5 and 7, comprises a compactly arranged slip clutch mechanism and throw-out mechanism. The sprocket 72 is free to rotate about the shaft 60 whenever an obstruction is encountered, so that the slip clutch is actuated. The slip clutch is provided with ratchet members 74 and 75. The ratchet member 75 is drivingly connected by lug 75' to the sprocket 72, while the ratchet member 74 has drive lugs 74' which drivingly engage slots of a throw-out clutch 76, which is slidably mounted on the shaft 60 and keyed thereto in the usual manner. The pressure between the slip clutch ratchets 74 and 75 is governed by a spring 77 adjusted by a nut 78. The throw-out clutch 76 is held in its driving position, as best shown in Figure 7, by a spring 79 abutting the collar, which is held in its position by a cotter key 80. Mounted on the throw-out clutch 76 is a throw-out rod 81 which is formed to encircle a groove 82 in the collar. The groove 82 is formed between the two portions 76' and 76'' of the throw-out clutch 76. The throw-out portion 76' is secured to drive the shaft 60, while the portion 76'' is journaled on the shaft 60 and carries the clutch ratchets 74 and 75 and the sprocket 72 on its longitudinally extending portion 76'''. The portions 76' and 76'' carry complementary engaging clutch portions or clutch means, which are thrown in and out of engagement by the throw-out rod 81. The throw-out rod 81 is pivotally connected to a bell crank lever 83 supported from the thrust member 27 by a bracket 84, as best shown in Figure 7. As shown in Figures 6 and 7, a forwardly and downwardly extending throw-out rod 85 is pivotally connected at its lower end to the bell crank lever 83, and at its upper end it is adjustably connected by a pivoted adjusting connection 86 to an arm 87 welded or otherwise secured to the transverse rock-shaft 43. It is, therefore, obvious that, when the lever 53 is actuated to raise the furrow opener units to transport position, the throw-out clutch is operated to throw the drive mechanism for the hopper units out of gear, and, when the furrow opener units are lowered to their ground engaging position, the throw-out clutch mechanism is thrown into operation.

The chain 71 may be tightened or loosened by adjusting chain tightener arms 88 which are welded or otherwise secured to the transverse supporting bar 59. The tightener arms have arcuate slots therein. As the member 59 is rocked to loosen or tighten, the chain tightener arms are secured in their adjusted position by clamp bolts 89 secured to the lower ends of the supporting members 21 and 22. Since the jack-shaft 60 is connected to the bar 59 by the brackets 64 and intermediate supporting members 65, the same is rocked with the bar 59.

As shown in Figures 1, 3 and 4, the planter hopper units 61 and 62 have their frame members pivotally mounted on the transverse supporting bar 59. The planter hopper unit frames 61 and 62 comprise U-shaped members 90, which have the legs of the U secured to a connecting bracket 91, which is pivotally mounted on the transverse supporting bar 59, as best shown in Figures 3 and 4. The connecting bracket 91 is similar to the connecting bracket 36 of the draft frames 31 and 32 of the furrow opener units. The connecting brackets 91 are adjustably mounted on the transverse supporting bar 59 in the same manner as the connecting brackets 36 are adjustably mounted. The adjusting brackets 91 are held in adjusting position by adjusting collars. The planter hopper units 61 and 62 may be adjusted in and out laterally on the transverse supporting bar 59 to coincide in adjusted position with the draft frames 31 and 32 for the furrow opener units.

Hopper units 92 and 93, of the well known duplex type, are supported on the frames 90. The hopper units, being of the duplex type, may sow two separate kinds of seed, as desired, through separate discharge tubes 94, as for instance when it is desired to sow two such legumes as peas and beans, though it is obvious that other combinations of seeds may be sowed together. In the particular instance described, these planter units are used to sow cotton. The seed plates of the hopper units 92 and 93 are each driven from the main planter drive shaft, or jack shaft, by chain drive mechanisms 95, or means for driving each of said seed depositing mechanisms, respectively, as best shown in Figures 1, 3 and 5. Sprockets 97 and 98, as best shown in Figure 5, are adjustably mounted on the shaft 60 for the purpose of adjusting the position of the chain drive mechanism whenever the units are adjusted for different row spacings. The sprockets 97 and 98, through chains 99 and 100, drive sprockets 101 of each of the planter hopper units 92 and 93, respectively. It is obvious that, as previously described, when the lever 53 is adjusted to raise or lower the furrow opener units to ground engaging position or transport position, the seed plates of the planter units 92 and 93 are thrown in or out of operation.

To support the weight of the hoppers and the seed therein, a supporting rod 102 pivotally connects each planter hopper unit to a supporting bracket 103 loosely mounted on the rock-shaft 43. The bracket 103 has a slotted portion engaged by one of the lugs 104 of the lifting arm 45. With this construction, as the lifting arm 45 is adjusted laterally on the rock-shaft for different row spacings, the bracket 103 is simultaneously adjusted with it, thereby providing means for laterally adjusting the implement or furrow opener frame and hopper support structure together. A counterbalancing mechanism is arranged with this rod 102 by having a counterbalancing spring 105 supported at its upper end on the bracket 103, and at its lower end connected to a bracket 106, which is clamped to the supporting rod 102. It is obvious that the weight of the hopper units is carried by the spring, or resilient counterbalancing means 105. The vertical position of the hopper unit may be adjusted by an adjusting collar 107 at the upper end of the rod 102, the collar being in abutting relationship with the upper end of the supporting bracket 103. It is, therefore, obvious that the hopper units may be adjusted vertically to correspond with similar positions of the furrow opener units when the furrow opener units are adjusted for planting in furrows on level ground, or for planting on beds. It is obvious that the spring 105 counterbalances the weight of the hopper units when they are filled with seed, and the tension of the spring may be so adjusted that the hopper units may be considered as floating.

It is apparent that, as the draft frames for the furrow opener units are raised, a stop or stop means 108, which is secured to a lifting rod 109, abuts a bracket 110. As the lifting rod is pivotally mounted on a rearwardly extending support 111 and secured to the draft frames of the furrow opener units, it is obvious that, as the draft frames are raised through the distance gauged by an upper stop or stop means 112, the lower stop 108 abuts the bracket 110, causing the hopper units to take the position shown in Figure 2. It is apparent that the movement of the furrow opener units is free to rise and fall vertically between the limits of the stop members 108 and 112. The lifting rod 109 on the bracket 110 forms a lost motion connection between the stops 108 and 112 as the weight of the furrow opener units is balanced by the spring 57, and, as each of the hopper units is counterbalanced by the spring 105, it is obvious that very little effort is needed by the operator to actuate the lifting lever 53 to raise or lower the planting units from ground engaging to transport position. The aforesaid structure forms a lost motion means connecting said implement frame and frame structures together to have relative movement with respect to each other.

It is apparent from the description that a very simple rear mounted tractor planter construction has been described. The planter units are closely coupled to the rear of the tractor, so that any raising or lowering of the front end of the tractor does not affect the depth of planting, as the furrow openers 33 are very close to the center line of the vertical axis of the rear wheels. As the furrow opener units carry none of the weight of the planter hoppers, it is obvious that in certain soil conditions the furrow opener units will not bury themselves, causing the seed to be planted too deeply. With the present construction the planting depth is uniform throughout the field. In addition, the hopper units are carried substantially as close to the furrow opener units as they are when the hopper units are directly mounted and rigidly connected to the furrow opener units. The construction of the furrow unit draft connection is such that the furrow openers may plant in furrows, on level ground, or in beds, and in each of these conditions the position of the hopper units may be similarly adjusted by adjusting the position of the rod 102 by means of the stop collar 107. The drive mechanism of each of the planting units is thrown in and out of gear as the furrow opener units are raised or lowered. A very compact throw-out and slip clutch has been provided, so that, in case any one of the planting mechanisms is clogged, the slip clutch will operate. The tractor planter attachment is such that it may be readily attached to and disconnected from the tractor as a complete unit.

To detach the planter from the tractor, loosen set screws in stand clamps 113 (Figure 3), which are mounted on the transverse draft member 29, and drop the supports or supporting means 114 from the position shown in Figure 1 to the dotted line position, then tighten the set screws in the clamps 113. Then, as shown in Figure 1, secure the adjusting collar 50 in the dotted line position beneath the lost motion connection 47, forming means for rigidly supporting said transverse frame structure from said implement frame. The drive chain 71 may then be detached after first loosening the chain by adjusting the chain tightener bracket 88. The bolts 23 and 24 are then loosened and swung forwardly. The tractor is now ready to be driven away, leaving the planter in detached position for subsequent attachment. The sprocket 67 can be removed, if necessary, by removing the section 69 and detaching the clamp 68. In this tractor planter it is apparent that the upper hopper construction and the lower furrow opener units move relatively with respect to each other, and that when detached, as the units are not supported by means of the stop collar 50 on the lifting rods 48, the units would collapse with respect to each other. The lifting rod 48 with the stop collar 50 and their adjacent parts provide means for preventing the collapse of the hopper units with respect to the furrow opener units. It is obvious that the tractor planter attachment may be attached to the tractor by reversing the procedure of the previous description. It is apparent from the description of the procedure for attaching and detaching the planter that a planter attachment has been provided which may be readily attached to and detached from a tractor in the shortest possible time. Also, a planter of low hopper construction has been provided, which is adapted for use with tractors.

While the construction above described exemplifies one preferred form of the invention, it will be obvious to those skilled in the art that certain modifications in the structure are possible without departing from the scope of the invention as defined in the following claims.

What is claimed as new is:

1. In combination with a tractor having a rear axle, a direct-connected planter structure comprising a supporting structure adapted for attachment to the rear axle of the tractor having a forwardly inclined portion extending to a point in front of the rear axle and a rearwardly inclined portion extending to a point in the rear of the axle, a furrow opener structure mounted for vertical movement on the forwardly inclined portion, a hopper structure on the supporting structure and lift means carried by the rearwardly inclined portion for raising and lowering the furrow opener structure.

2. In a seed planter attachment for tractors, a thrust and support structure adapted for quick attachment to the tractor, three transverse members carried by said structure, said members being of different height from the ground, furrow opener frames pivoted to the lowermost member, a hopper structure with associated drive means separately pivoted to the next higher intermediate member, and means carried by the uppermost member for simultaneously raising and lowering the furrow opener frames and hopper structure.

3. In a seed planter attachment for tractors having a rear axle, a thrust and support structure adapted for quick attachment to the rear axle of the tractor, three transverse members carried by said structure respectively at points forwardly and rearwardly of the axle and at different heights, furrow opener frames pivoted on the forwardmost and lowermost transverse member, hopper structures with associated drive means therefor pivoted to the less forward and next higher transverse member, and means carried by the least forward and highermost member for simultaneously raising and lowering the furrow opener frames and hopper structure.

4. In combination with a tractor having a planter drive sprocket, a seed planter structure comprising a supporting structure directly connected to the tractor, furrow openers pivoted to the supporting structure, a transverse member carried by the structure, hopper structures separately pivoted to the transverse member, means for simultaneously raising and lowering the furrow openers and hopper structures, a drive mechanism for the hopper structures carried by the transverse member and adapted to be angularly adjusted with relation thereto, chain drives connecting said mechanism with the tractor planter drive sprocket and with the hoppers, and means for adjustably moving and fixing the drive mechanism about said transverse member to tighten one of the chain drives.

5. In combination with a tractor having a rear axle, a seed planter structure comprising a thrust and support structure directly connected to the rear axle of the tractor, a hopper structure mounted for movement on said support structure, means for cushioningly supporting the hopper structure from downward movement and for permitting raising movement, a furrow opener structure attached for independent raising movement immediately beneath said hopper structure and having means adapted to engage with the hopper structure upon the furrow opener structure being raised, and means for lifting the furrow opener structure and hopper structure together for transporting the same.

6. In combination with a tractor, a seed planter structure comprising a thrust and support structure directly connected to the tractor, a high transverse member carried by the support structure, hopper structures pivotally attached to the support structure, spring means for resiliently supporting the hopper structures and allowing upward movement, furrow opener structures independently pivoted to the thrust and support structure immediately beneath the hopper structures and having means adapted to engage with the hopper structures upon being pivoted, means carried by the transverse member for raising the furrow opener structures and hopper structures to a transport position.

7. The combination with a wheel supported frame, of an implement attachment comprising an upper frame structure mounted for vertical movement, an implement frame mounted for vertical movement and positioned below said frame structure and having ground engaging tools mounted thereon, lost motion means connecting said implement frame and frame structure together whereby said implement frame and frame structure have relative movement with respect to each other, said lost motion means comprising stop means adapted to engage said upper frame structure, and lifting means connected to said implement frame for adjusting said implement frame vertically whereby said stop means engages said upper frame structure for moving said frame structure vertically together with the implement frame.

8. The combination with a wheel supported frame, of an implement attachment adapted to be attached to and detached from said wheel supported frame comprising a supporting structure mounted on said wheel supported frame, a plurality of laterally spaced frame structures pivotally mounted on said supporting structure for vertical movement, thrust means secured to said supporting structure, implement frames pivotally mounted on said thrust means for vertical movement and positioned below said frame structures and having ground engaging tools mounted thereon, means connecting each of said implement frames and frame structures for relative movement with respect to each other, and lifting means connected to each of said implement frames for adjusting said implement frames vertically whereby said implement frame and said upper frame structure are adjusted vertically at the same time and are capable of relative movement with respect to each other, said lifting means including means for rigidly supporting said supporting structure from said implement frame when in detached position, and supporting means for supporting the forward portion of said implement attachment whereby said implement attachment is supported in detached position for subsequent attachment.

9. The combination with a wheel supported frame, of a planter attachment comprising a transverse supporting structure, a plurality of seed dispensing units pivotally mounted on said transverse supporting structure, a plurality of furrow forming units pivotally mounted on said transverse supporting structure adjacent their respective dispensing units, means for counterbalancing the weight of the seed dispensing units, lost motion connecting means between said seed dispensing units and said furrow forming units whereby the weight of the seed dispensing units is supported independently of the furrow forming units during ground engaging position, and lifting means for raising and lowering said seed dispensing units and said furrow forming units from ground engaging to transport position.

10. In combination, a tractor having a drive means, a hopper attachment comprising a supporting structure directly connected to the tractor, a transverse member carried by the structure, hopper mechanisms mounted on the structure, a drive mechanism for the hopper mechanisms carried by the transverse member and adapted to be angularly adjusted with relation thereto, flexible drive means connecting said mechanism to the tractor drive means and with the hopper mechanisms, and means for adjustably moving and fixing the drive mechanism about said transverse member to tighten one of the flexible drive means.

11. In combination, a tractor having a drive means, a hopper mechanism attached to the tractor, a drive mechanism for the hopper mechanism mounted for angular adjustment, flexible drive means connecting said drive mechanism with the tractor drive means and with the hopper mechanism, and means adjustably moving and fixing the drive mechanism to tighten one of the flexible drive means.

12. In combination with a tractor having a rear axle, a planter structure comprising a supporting structure adapted for attachment to the rear axle of the tractor and having a forwardly inclined portion extending to a point in front of the rear axle and a rearwardly inclined portion extending to a point in the rear of the rear axle, a furrow opener structure pivoted for vertical movement to the forwardly inclined portion, a hopper structure pivoted for vertical movement on the supporting structure, and lifting means carried by the rearwardly inclined portion for raising and lowering the furrow opener and hopper structures.

13. In combination with a tractor having a rear axle, a planter structure comprising a supporting structure adapted for attachment to the rear axle of the tractor and having a rearwardly extending portion, a furrow opener structure pivoted to the supporting structure, a hopper structure pivoted to the supporting structure above the furrow opener structure, and lifting means carried by the rearwardly extending portion for raising and lowering the furrow opener and hopper structures.

14. In combination with a tractor, a seed hopper structure pivoted for free vertical movement on the tractor, a furrow opener structure pivoted for independent free vertical movement on the tractor immediately below the hopper structure and having means adapted to engage with the hopper structure to lift the same upon the furrow opener structure moving vertically upward, and means for lifting the furrow opener and hopper structures to a transport position.

15. In combination with a tractor, a direct-connected planter attachment adapted to be connected to the tractor as a unit comprising a readily connectable supporting structure adapted to be attached to the tractor, a hopper structure pivotally attached to the supporting structure, a furrow opener structure independently pivoted to the supporting structure beneath the hopper structure and having means adapted to engage with the hopper structure upon the furrow opener structure being lifted, said furrow opener structure normally having free vertical movement with respect to the hopper structure, and means carried by the suporting structure for lifting the furrow opener and hopper structures to a transport position.

16. The combination with a wheel supported frame, of a seed dispensing unit pivotally mounted on said frame, a furrow forming unit pivotally mounted on the frame immediately below the seed dispensing unit, means for counterbalancing the weight of the seed dispensing unit, lost motion connecting means between said seed dispensing unit and said furrow forming unit whereby the weight of the seed dispensing unit is supported independently of the furrow forming unit in its ground engaging position, and lifting means for raising and lowering said seed dispensing and furrow forming units to a transport position.

17. In combination with a tractor, a direct-connectable planter attachment adapted to be connected to the tractor as a unit and including a furrow opener structure adapted to have vertical movement from a ground position to a transport position, a hopper structure located for independent vertical movement above the furrow opener structure, and means associated with both of said structures for the engaging of the furrow opener structure with the hopper structure whereby lifting of the hopper structure will be effected upon raising the furrow opener structure from a ground position to the transport position.

18. In combination with a tractor, a planter attachment adapted to be connected to the tractor as a unit, including a furrow opener structure adapted to have vertical movement and extending substantially parallel with the ground when in its ground working position, a hopper structure mounted for vertical movement immediately above and near to the furrow opener structure but permitting of sufficiently free vertical movement of the furrow opener structure relative to the hopper during the normal planting operation, and means associated with both of said structures for the engaging of the furrow opener structure with the hopper structure whereby lifting of the hopper structure will be effected upon raising the furrow opener structure from the ground working position to a transport position.

19. In combination with a tractor, of a direct-connectable seed planter attachment adapted to be connected to the tractor as a unit including hopper structure mounted for independent vertical movement, a furrow opener structure mounted for vertical movement and positioned below said frame structure and having a ground working tool thereon, lost motion means connecting said furrow opener and hopper structure together whereby said structures have relative movement with respect to each other, said lost motion means including stop means adapted to engage the hopper structure, and lifting means connected to said furrow opener structure for adjusting the same vertically whereby the stop means engages the hopper structure for moving the same vertically together with the implement.

JAMES L. HIPPLE.